United States Patent
Bremer

(10) Patent No.: US 10,484,933 B2
(45) Date of Patent: Nov. 19, 2019

(54) NETWORK ENTITY FOR MANAGING COMMUNICATIONS TOWARDS A USER ENTITY OVER A COMMUNICATION NETWORK

(75) Inventor: Rainer Bremer, Sankt Augustin (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 13/816,597

(22) PCT Filed: Aug. 10, 2011

(86) PCT No.: PCT/EP2011/063772
§ 371 (c)(1),
(2), (4) Date: Feb. 12, 2013

(87) PCT Pub. No.: WO2012/020055
PCT Pub. Date: Feb. 16, 2012

(65) Prior Publication Data
US 2013/0142126 A1    Jun. 6, 2013

(30) Foreign Application Priority Data
Aug. 12, 2010  (EP) ................... 10172622

(51) Int. Cl.
*H04W 4/00*     (2018.01)
*H04W 48/16*    (2009.01)
(Continued)

(52) U.S. Cl.
CPC ........ *H04W 48/16* (2013.01); *H04L 65/1016* (2013.01); *H04L 65/1073* (2013.01);
(Continued)

(58) Field of Classification Search
CPC ..... H04W 24/02; H04W 28/02; H04W 76/02; H04W 8/22; H04B 7/0626; H04L 12/66;
(Continued)

(56) References Cited

U.S. PATENT DOCUMENTS 5,907,544 A    5/1999   Rypinski
7,239,864 B2   7/2007   Zhang
(Continued)

FOREIGN PATENT DOCUMENTS

CN    10132405     2/2008
CN    101433036    5/2009
(Continued)

OTHER PUBLICATIONS

Ericsson., 3GPP TSG SA WG2 Architecture—S2, No. 56, Jan. 15-19, 2007, 10 Pages, "Consideration of the relationship between Domain Selection and Personal Network Management."
(Continued)

*Primary Examiner* — Atique Ahmed
(74) *Attorney, Agent, or Firm* — Brooks Kushman P.C.

(57) ABSTRACT

A network entity for managing communications towards a user entity over a communication network, the network entity having an access domain selector for determining an access domain of the user entity upon the basis of user entity specific data, and an application server for providing the user entity specific data.

8 Claims, 3 Drawing Sheets

(51) Int. Cl.
*H04W 48/00* (2009.01)
*H04L 29/06* (2006.01)
*H04W 48/18* (2009.01)

(52) U.S. Cl.
CPC ............ *H04L 65/80* (2013.01); *H04W 48/17* (2013.01); *H04W 48/18* (2013.01)

(58) Field of Classification Search
CPC ............ H04L 65/1069; H04L 65/1006; H04M 7/006; H04M 1/2535; H04M 3/44; H04M 1/274558; H04M 3/42; H04M 3/42059; H04M 1/2745
USPC ..... 370/328, 352, 252; 379/216.01; 709/226
See application file for complete search history.

(56) References Cited

U.S. PATENT DOCUMENTS

| | | | |
|---|---|---|---|
| 7,395,336 | B1 | 7/2008 | Santharam et al. |
| 7,640,036 | B2 | 12/2009 | Kallio |
| 7,721,106 | B2 | 5/2010 | Zhang |
| 8,083,586 | B2 | 12/2011 | Foe et al. |
| 8,340,084 | B2 | 12/2012 | Nakada et al. |
| 8,582,566 | B2 | 11/2013 | Bae et al. |
| 8,811,954 | B1* | 8/2014 | Mahdi .................... H04L 65/40 370/338 |
| 8,812,382 | B2 | 8/2014 | Koskinen et al. |
| 2002/0193093 | A1 | 12/2002 | Henrikson et al. |
| 2004/0180676 | A1 | 9/2004 | Haumont et al. |
| 2004/0208144 | A1 | 10/2004 | Vinayakray-Jani |
| 2004/0225878 | A1 | 11/2004 | Costa-Requena et al. |
| 2005/0014485 | A1 | 1/2005 | Kokkonen et al. |
| 2005/0059398 | A1 | 3/2005 | Jaupitre et al. |
| 2005/0278447 | A1* | 12/2005 | Raether .................. H04L 67/16 709/227 |
| 2006/0178131 | A1 | 8/2006 | Huotari et al. |
| 2006/0271800 | A1 | 11/2006 | Li et al. |
| 2007/0189301 | A1 | 8/2007 | Kiss et al. |
| 2007/0190990 | A1* | 8/2007 | Yin ........................ H04W 8/18 455/414.3 |
| 2007/0249342 | A1* | 10/2007 | Huang .................... H04L 63/08 455/435.1 |
| 2007/0259651 | A1 | 11/2007 | Bae et al. |
| 2008/0002820 | A1 | 1/2008 | Shtiegman et al. |
| 2008/0080480 | A1* | 4/2008 | Buckley .................. H04L 12/66 370/352 |
| 2008/0215736 | A1* | 9/2008 | Astrom ............. H04L 29/06027 709/226 |
| 2008/0263631 | A1 | 10/2008 | Wang et al. |
| 2008/0267171 | A1* | 10/2008 | Buckley et al. ............. 370/352 |
| 2008/0299971 | A1 | 12/2008 | Cai et al. |
| 2009/0034736 | A1 | 2/2009 | French |
| 2009/0193131 | A1 | 7/2009 | Shi |
| 2009/0307482 | A1 | 12/2009 | McCann |
| 2010/0015968 | A1 | 1/2010 | Moriwaki et al. |
| 2010/0069101 | A1* | 3/2010 | Mahdi ................. H04L 65/1016 455/466 |
| 2010/0157985 | A1* | 6/2010 | Nakada ................. H04W 48/18 370/352 |
| 2010/0177780 | A1 | 7/2010 | Ophir et al. |
| 2010/0182998 | A1* | 7/2010 | Nakada ............... H04L 65/1069 370/352 |
| 2010/0215018 | A1* | 8/2010 | Ejzak ................ H04W 36/0022 370/331 |
| 2010/0274908 | A1 | 10/2010 | Koskelainen |
| 2011/0164613 | A1 | 7/2011 | Xie |
| 2011/0270995 | A1* | 11/2011 | Mutikainen ....... H04L 29/12584 709/227 |
| 2012/0005157 | A1 | 1/2012 | Forsberg et al. |
| 2012/0026946 | A1 | 2/2012 | Zhu et al. |
| 2012/0307732 | A1* | 12/2012 | Olsson .................. H04W 64/00 370/328 |

FOREIGN PATENT DOCUMENTS

| | | |
|---|---|---|
| CN | 101437093 | 5/2009 |
| CN | 101641937 | 2/2010 |
| EP | 1523208 | 4/2005 |
| EP | 1853037 | 11/2007 |
| EP | 2061269 | 5/2009 |
| EP | 2068529 | 6/2009 |
| JP | 2001202014 | 7/2001 |
| JP | 2001297029 | 10/2001 |
| JP | 2007515690 | 6/2007 |
| JP | 2008543474 | 12/2008 |
| KR | 20090130296 | 12/2009 |
| WO | 03092218 | 11/2003 |
| WO | 2006120289 | 11/2006 |
| WO | 2008120028 | 10/2008 |
| WO | 2008145610 | 12/2008 |
| WO | 2008152133 | 12/2008 |
| WO | 2009074846 | 6/2009 |
| WO | 2010031230 | 3/2010 |
| WO | 2011072747 | 6/2011 |

OTHER PUBLICATIONS

Antipolis., ETSI TS 123 228 V6.8.0, 2004, 181 Pages, "Digital cellular telecommunications system (Phase 2plus); Universal Mobile Telecommunications Systems (UMTS); IP Multimedia Subsystem (IMS); Stage 2."
Rosenberg et al. Standards Track, RFC 3261, Jun. 2002, 240 Pages, "SIP Session Initiation Protocol."
Gonzalo., John Wiley and Sons Ltd, 2004, 20 Pages, "SIP Entities."
International Search Report for PCT/EP2011/063772, Completed by the European Patent Office dated Aug. 29, 2011, 3 Pages.
CN 101132405 A, Abstract & related U.S. Publication No. 2009/0193131.
CN 101437093 A, Abstract & Machine Translation.
CN 101433036 A, Abstract & related U.S. Pat. No. 8,582,566.
CN 101641937 A, Abstract & related U.S. Pat. No. 8,340,084.
WO 2010031230 A1, Abstract & related U.S. Publication No. 2011/0164613.
JP 2001202014, Abstract & Machine Translation.
Gonzalo Camarillo et al. John Wiley and Sons LTD, 2004, All together 423 Pages, "Chapter 5. Session Control in the IMS."
Korean Notice of Decision for Patent Translation attached to original for Korean Application No. KR 10-2015-0173431, Both completed by the Korean Patent Office, dated Mar. 20, 2017 All together 9 Pages.

* cited by examiner

NETWORK ENTITY FOR MANAGING COMMUNICATIONS TOWARDS A USER ENTITY OVER A COMMUNICATION NETWORK

CROSS-REFERENCE TO RELATED APPLICATION

This application is the U.S. national phase of PCT Appln. No. PCT/EP2011/063772 filed on Aug. 10, 2011, which claims priority to European Patent Application No. 10172622.2 filed on Aug. 12, 2010, the disclosures of which are incorporated in their entirety by reference herein.

TECHNICAL FIELD

The present invention relates to mobile communications, in particular to mobile voice communications over communication networks.

BACKGROUND

For mobile data communications, layered communication according to the 3GPP specification (3rd Generation Partnership Project) may be deployed. The 3GPP specification comprises three distinct layers: an application layer, a network control layer and a connectivity layer. The application layer supports end-user applications and may be implemented in mobile stations or application servers in the network. The application layer interfaces with the network layer to enable designing and implementing different services and applications. The network control layer supports communicating services across e.g. different types of networks such as circuit-switched domain networks based on the GSM standard using e.g. an ISDN-related technology or packet-switched networks employing e.g. IP technologies. The connectivity layer is a transport layer capable of transporting any type of service via e.g. voice, data and multimedia streams.

The 3GPP specification defines the Long Term Evolution (LTE) as an access network technology. The LTE comprises a MME (Mobility Management Entity) forming a control-entity suitable for signalling and selecting a serving gateway (SGW) which routes and forwards data packets carrying e.g. multimedia services. For delivering the multimedia services across the access network, the 3GPP specification defines the IP Multimedia Subsystem (IMS). The IMS comprises a service layer forming an application layer, a control and connectivity layer forming a network control layer, and an access layer forming a connectivity layer. The control and connectivity layer comprises call session control functions (CSCF) forming central entities for session initiation protocol (SIP) signalling. Among the CSCFs, a serving CSCF (S-CSCF) forms a central node for handling registrations of a user entity (UE) in a communication network. The IMS further specifies an access domain selector (ADS) for selecting an access domain to which the user entity is connected. The access domain selector may be implemented in a service centralization and continuity application server (SCC-AS) as specified in the 3GPP TS 23.237 specification. The IMS further specifies an application server (AS) which is provided for hosting and executing services for user entities. An example of an application server is the multimedia telephony service server (MMTeI) offering multimedia communications such as voice. Another example of an application server is the voice call continuity server (VCC).

For establishing a communication link towards the user entity, the application server and the access domain selector may independently query the home subscriber server for user entity specific data e.g. indicating an access domain for accessing to the user entity, which may result in a number of network queries.

SUMMARY

It is the object of the invention to provide an efficient concept for providing user entity specific data to network entities of a communication network.

This object is achieved by the features of the independent claims. Further embodiments may be based on the features of the dependent claims.

The invention is based on the finding that user entity specific data may efficiently be provided to network entities of a communication network by collocating those network entities which may require the user entity specific data. The collocated network entities may directly exchange the user entity specific data so that a number of queries to the communication network may be reduced.

With exemplarily reference to the IMS, a collocation of an application server and an access domain selector may reduce the number of queries for the user entity specific data in the IMS communication network. By way of example, the application server may query a home subscriber server to obtain the user entity specific data. Therefore, the access domain selector which is collocated to the application server may directly obtain the user entity specific data from the application server without querying the home subscriber server over the IMS communication network to obtain the user entity specific data.

According to an aspect, the invention relates to a network entity for managing communications towards a user entity over a communication network. The network entity has an access domain selector for determining an access domain of the user entity upon the basis of user entity specific data, and an application server for providing the user entity specific data. The application server may host and execute services for a user entity, e.g. for a mobile terminal. The access domain selector may implement a terminating access domain selection function of the IMS standard. The access domain may be formed by a package-switched access network or by a circuit switched access network via which to access to the user entity By way of example, the application server may have received the user entity specific data from a network register such as a home subscriber server according to the IMS technology. The application server may then provide the user entity specific data to the access domain selector so that the access domain selector may avoid querying the network register for obtaining the user entity specific data.

According to an embodiment, the access domain selector may directly refer to the application server in order to obtain the user entity specific data. The application server may also prestore the user entity specific data for the access domain selector. If the data required by the access domain selector cannot be provided by the application server, then the access domain selector may query these data from the home subscriber server according to the IMS technology.

According to an embodiment, the access domain selector and the application server may be collocated to form the network entity. By way of example, the access domain selector and the application server may communicate with each other via an interface. However, the functionality of the access domain selector and the functionality of the application server may be mutually implemented in hardware and/or in software.

According to an embodiment, the user entity specific data has at least one of: repository data according to the IP multimedia subsystem (IMS), a network identifier associated with the user entity that can be represented by way of example by a visitor location register number, voice support information indicating whether the access domain supports a voice service within a packet-switched access domain, in particular the capability of the access domain to support voice over IP in the case of a packet-switched access domain, information relating to a communication status of the user entity, the communication status indicating whether the user entity is currently communicating, and type information indicating a type of the access domain, the type of the access domain indicating a packet-switched access domain or a circuit-switched access domain, a user entity identifier, in particular an international mobile subscriber identity (IMSI) and/or a Mobile Subscriber ISDN Number (MSISDN). By way of example, the communication status may comprise a busy status, an idle status, a non-available status or a non-network registered status.

According to an embodiment, the network entity may have a storage, in particular a storage which is collocated to the network entity, wherein the application server may be configured to store the user entity specific data in the storage and wherein the access domain selector may be configured to retrieve the user entity-specific data from the storage. The storage may be implemented in the application server or in the access domain selector. Generally, the storage may be an element of the network entity. The access domain selector, the application server and the storage may communicate with each other via an interface.

According to an embodiment, the application server may be configured to determine the user entity specific data upon registration of the user entity to the communication network and/or during a session setup. By way of example, the application server may receive the user entity specific data from an HSS in order to determine services, e.g. roaming or billing, for the user entity.

According to an embodiment, the application server is an IMS application server which is configured to transmit a request, e.g. an Sh pull request, for the user entity specific data towards the communication network via an Sh interface according to the IMS technology. By way of example, the application server, when communicating according to the IMS, may query the HSS to obtain the user entity specific data in order to determine which services are applicable for the user entity. The communication between the application server and the HSS may be performed via the Sh interface according to the IMS.

According to an embodiment, the application server is an IMS application server being configured to receive the user entity specific data via an Sh interface over the communication network, in particular from an HSS. The HSS may transmit the user entity specific data via the Sh interface towards the application server upon receiving a request from the application server to transmit the user entity specific data as mentioned above.

According to an embodiment, the network entity may have a storage, e.g. a storage which is collocated to the network entity, and wherein the application server is an IMS application server being configured to transmit a request, in particular an Sh request, for the user entity specific data towards a home subscriber server, to receive the user entity specific data from the home subscriber server upon transmitting the request, and to store the user entity specific data in the storage. The access domain selector may retrieve the user entity specific data from the storage when determining the access domain for accessing to the user entity.

According to an embodiment, the network entity may have a storage, e.g. the aforementioned storage, for storing the user entity specific data, wherein the access domain selector may be configured to retrieve the user entity specific data upon receiving a session initiation request, e.g. a session initiation protocol (SIP) request such as SIP invite, the session initiation request requesting to establish a communication link towards the user entity. Upon the basis of the retrieved user entity specific data, the access domain selector may determine the access domain via which to access to the user entity for establishing the communication link.

According to an embodiment, the network entity may have a transmitter for transmitting a request for the user entity specific data towards the communication network.

According to an embodiment, the application server may have a transmitter for transmitting a request for the user entity specific data towards the communication network.

According to an embodiment, the network entity may have a receiver for receiving the user entity specific data from the communication network.

According to an embodiment, the application server may have a receiver for receiving the user entity specific data from the communication network.

The above-mentioned receivers may respectively comprise a receive filter, a demodulator etc. for receiving communication signals over a communication network. Correspondingly, the above-mentioned transmitters may respectively comprise transmit filter or modulators. However, the receivers and the transmitters may respectively form communication entities being able to communicate according to the internet protocol (IP).

According to an embodiment, the access domain selector is configured to determine upon the basis of the user entity specific data whether the access domain is a packet-switched access network, or whether the access domain is a circuit-switched access network and whether the packet-switched access network supports voice-over-IP.

According to an embodiment, the application server is an IMS application server, in particular an IMS multimedia telephone service (MMTel) application server.

According to an embodiment, the access domain selector is an IMS access domain selector, in particular a service centralization and continuity application server (SCC-AS). By way of example, the access domain selector may implement the terminating access domain selection function according to the IMS.

According to a further aspect, the invention relates to a method for managing communications towards a user entity of a communication network. The method has determining an access domain by an access domain selector, e.g. by the aforementioned access domain selector, upon the basis of user entity specific data for accessing to the user entity, and providing the user entity specific data for the access domain selector by an application server, e.g. by the afore-mentioned application server. Further method steps may be directly derived from the functionality of the network entity, of the aforementioned access domain selector and/or of the aforementioned application server.

According to an embodiment, the method may have transmitting a request, in particular via the Sh interface according to the IMS technology, for the user entity specific data by the application server towards a home subscriber server, receiving the user entity specific data by the application server from the home subscriber server upon transmitting the request, storing the user entity specific data by the application server, and retrieving the user entity specific data from the storage by the access domain selector, in particular upon receiving a session initiation request to establish a communication link towards the user entity.

BRIEF DESCRIPTION OF THE DRAWINGS

Further embodiments will be described with reference to the following figures, in which.

DETAILED DESCRIPTION

Figure 1:
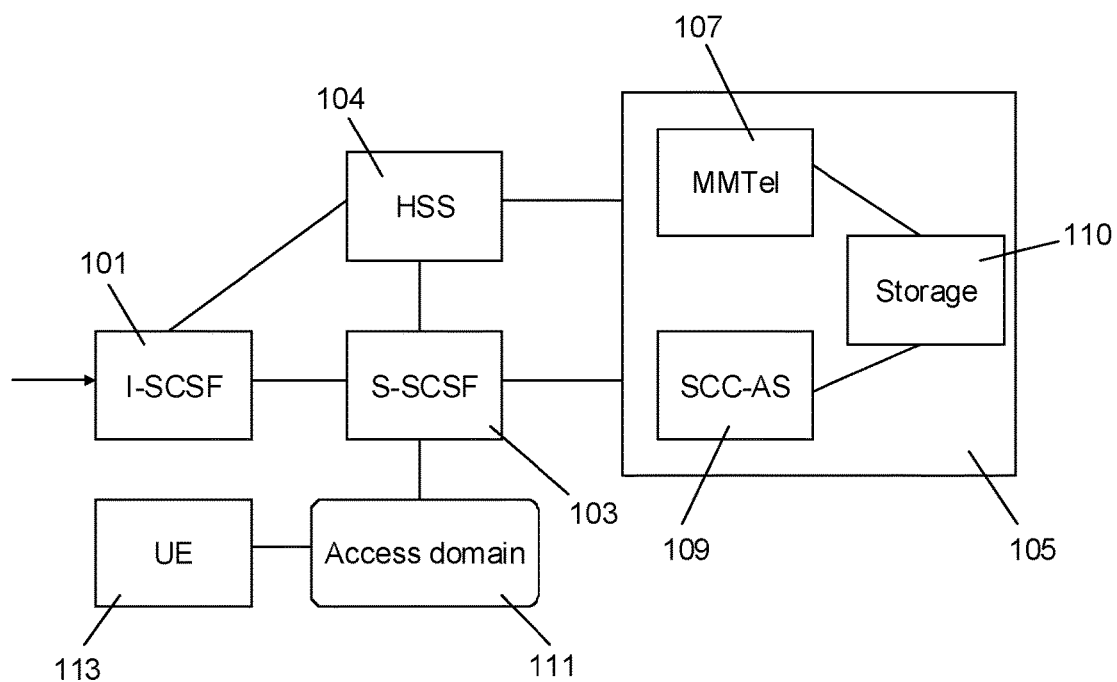
FIG. 1 shows a block diagram of a communication system according to an embodiment.

FIG. 1 shows a block diagram of a communication system according to the principles described herein with exemplarily reference to the IMS. The communication system comprises an interrogating entity 101, e.g. an interrogating call session control function (I-CSCF), a session control entity 103, e.g. a serving CSCF (S-CSCF), a network register 104, e.g. a home subscriber server (HSS), and a network entity 105. The network entity 105 comprises an application server 107, e.g. a multimedia telephony service server (MMTel), and an access domain selector 109, e.g. a service centralization and continuity application server (SCC-AS). According to an implementation, the network entity 105 communicates with the network register 104 and with the session control entity 103. The network entity 105 may further comprise a storage 110 which is in communication with the application server 107 and the access domain selector 109. According to an implementation, the interrogating entity 101 communicates with the network register 104 and with the session control entity 103.

FIG. 1 further shows an access domain 111 and a user entity 113 (UE) attached to the access domain 111. For a mobile terminating call towards the user entity 113, the session control entity 103 may relay on information provided by the access domain selector 109. According to an implementation, the information provided by the access domain selector 109 identifies the access domain 111. If the user entity 113 is network registered to an IMS communication network, then the access domain 111 may comprise a proxy CSCF (P-CSCF). If the user entity is network registered to a circuit-switched communication network, then the access domain 111 may comprise an access circuit switch.

In case of a mobile terminating call towards the user entity 113, the interrogating entity 101 may receive a session initiation request, e.g. a session initiation protocol (SIP) invite, from a calling party which is not depicted in FIG. 1. Then, the interrogating entity 101 may query the network register 104 to find out the session control entity 103 to which the user entity 113 is registered.

If the user entity 113 is registered to the session control entity 103, then the network register 104 informs the interrogating entity 101 accordingly. Then, the interrogating entity 101 forwards the session initiation request towards the session control entity 103. Subsequently, the session control entity 103 may query the application server 107 in order to determine services which are applicable for the user entity 113. Upon receiving the query, the application server 107 may query the network register 104 to obtain user entity specific data relating to the user entity 113. Thereafter, the network register 104 may transmit the requested user entity specific data towards the application server 107. The application server 107 may thereafter store the received user entity specific data in the storage 110. Then, the application server 107 may inform the service control entity 103 about the services which are applicable for the user entity. In the following, the session control entity 103 may refer to the access domain selector 109 to determine the access domain 111 via which to access to the user entity 113. Instead of requesting the network register 104 for the access domain 111 for reaching the user entity 113, the access domain selector 109 may refer to the storage 110. Thus, an additional request towards the network register 104 to obtain the user entity specific data may be avoided.

If the user entity 113 is served by the packet-switched access domain 111 for an active voice call, then the application server 107 may have knowledge about the active voice call and thus about the access domain where the user entity 113 can be reached for another incoming voice call. The information about the packet-switched access domain 111 serving the user entity 113 for an active voice call may be stored as user entity specific data in the storage 110. Instead of requesting the network register 104 for the access domain 111 for reaching the user entity 113 for another incoming call in parallel to a call that is still active, the access domain selector 109 may refer to the storage 110. Thus, an additional request towards the network register 104 to obtain the user entity specific data may be avoided.

If the user entity 113 is accessible via the access domain 111, then the access domain selector 109 informs the session control entity 103 accordingly. By way of example, the access domain selector 109 may inform the session control entity 103 that the user entity 113 is registered to a packet-switched access domain 111 and is therefore accessible via IMS. If the user entity 113 is registered to the circuit-switched domain, then the access domain selector 109 may provide specific routing information to the session control entity 103 that results into routing towards a circuit-switched access domain 111. According to an embodiment, the user entity 113 is a mobile terminal.

Figure 2:
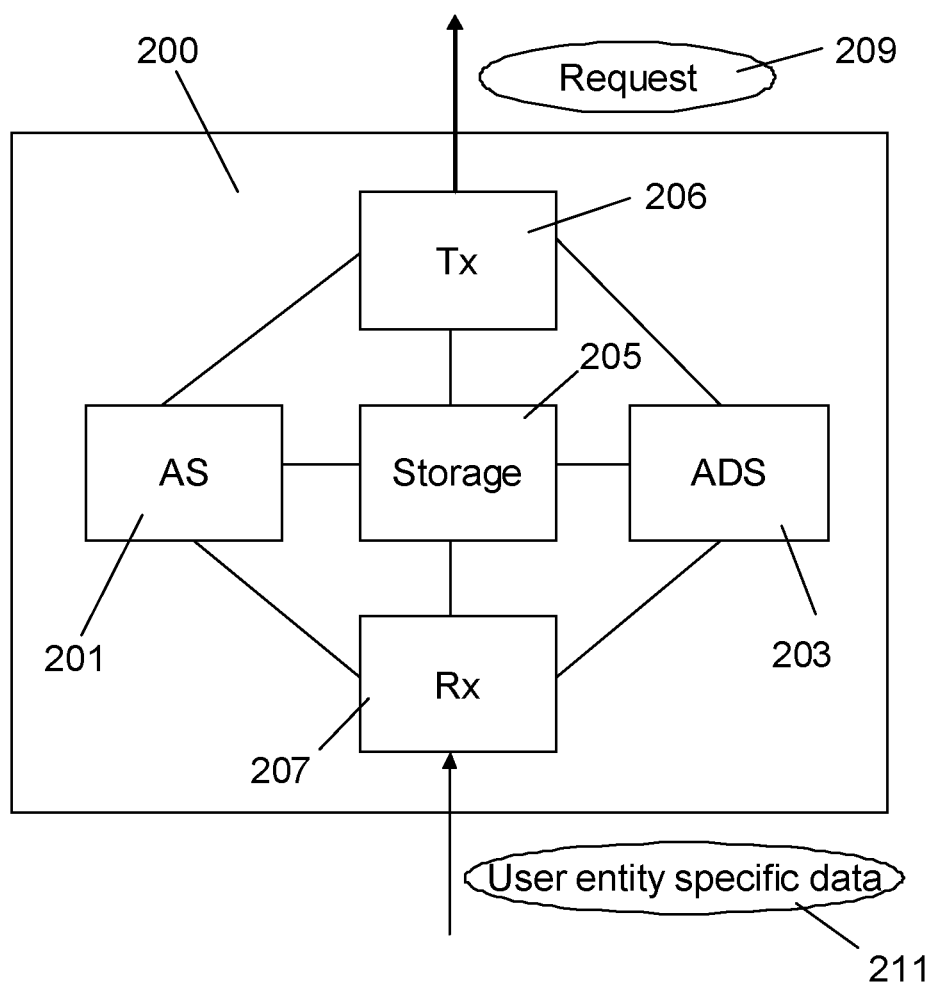
FIG. 2 further shows a block diagram of a network entity according to an embodiment.

FIG. 2 shows a block diagram of a network entity 200 according to an embodiment. The network entity 200 comprises an application server 201 (AS) and an access domain selector 203 (ADS). According to an implementation, the network entity 200 comprises a storage 205 in communication with the application server 201 and with the access domain selector 203. According to another implementation, the storage 205 may be implemented in the application server 201. According to yet another implementation, the storage 205 may be implemented in the access domain selector 203. According to yet another implementation, the storage 205 may form a network storage being accessible by the network entity 200, in particular by the application server 201 and/or by the access domain selector 203 (ADS), over a communication network.

According to an implementation, the network entity 200 comprises a transmitter 206 (Tx) which is in communication with the application server 201 and with the access domain selector 203. Correspondingly, the network entity 200 comprises a receiver 207 (Rx) which is in communication with the application server 201 and with the access domain selector 203. According to another implementation, the application server 201 and the access domain selector 203 may respectively comprise a transmitter and a receiver for communicating over the communication network.

According to an implementation, the receiver 207 is in communication with the storage 205 for e.g. storing user entity specific data obtained from e.g. an HSS.

According to an implementation, the transmitter 206 optionally is in communication with the storage 205.

According to an implementation, the application server 201 may, by means of the transmitter 206, transmit a request 209, e.g. via the an Sh interface according to the IMS, towards a communication network in order to request an home subscriber server which is not depicted in FIG. 2 for user entity specific data 211. The user entity specific data 211 may be transmitted by the home subscriber server towards the network entity 200 and may be received by the receiver 207. According to an implementation, the receiver 207 forwards the received user entity specific data 211 to the application server 201. In response to obtaining the user entity specific data 211, the application server 201 stores the user entity specific data 211 in the storage 205. According to an implementation, also the receiver 207 may be arranged to store the user entity specific data 211 in the storage 205.

According to an implementation, the application server 201 and/or the access domain selector 203 may be implemented in hardware or in software. According to an implementation, the application server 201 and the access domain selector 203 may be separate entities collocated to the network entity 200.

According to an implementation, the application server 201 and the access domain selector 203 may be implemented in the network entity 200. By way of example, the implementation may be performed on a processor, in particular on a digital signal processor.

Figure 3:
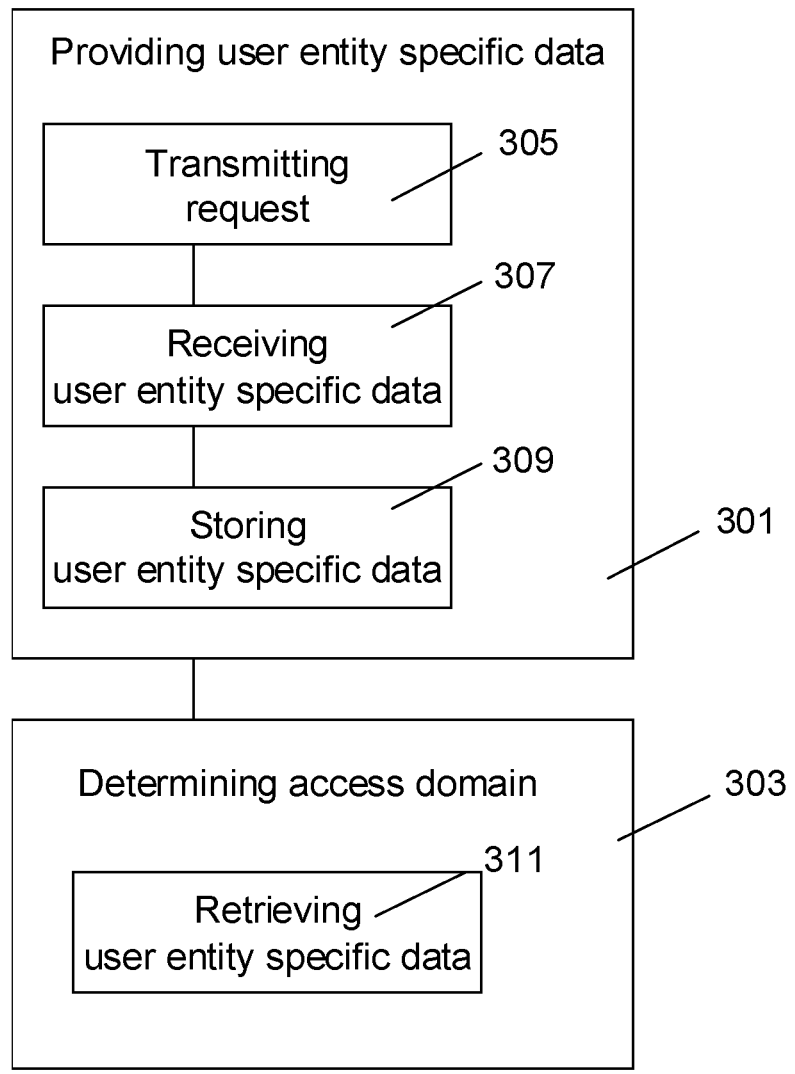
FIG. 3 shows a diagram of a method for managing communications towards a user entity according to an embodiment.

FIG. 3 shows a diagram of a method for managing communications towards a user entity, e.g. towards the user entity 113 shown in FIG. 1. According to an implementation, the method is performed by the aforementioned network entity 200.

The method has the step of providing 301 user entity specific data e.g. by the application server 201 for access domain selection. The method further has determining 303 an access domain upon the basis of the user entity specific data e.g. by the access domain selector 203 shown in FIG. 2.

According to an implementation, the step of providing 301 user entity specific data comprises transmitting 305 a request for user entity specific data e.g. by the application server 201 shown in FIG. 2 towards a network register, e.g. towards an HSS 104 as shown in FIG. 1, receiving 307 the user entity specific data e.g. by the application server 201 shown in FIG. 2 from the network register upon transmitting 305 the request, and storing 309 the user entity specific data e.g. by the application server 201 e.g. in the storage 205 shown in FIG. 2. According to an implementation, the step of determining 303 the access domain comprises retrieving 311 user entity specific data from e.g. the storage 205 shown in FIG. 2 by the access domain selector 203 shown in FIG. 2 in order to determine the access domain.

Some of the above-described embodiments and implementations enable to reduce a number of queries in a communication network for obtaining user-specific information.

The above-mentioned embodiments of the methods of the present invention may be embodied by respective means to form a respective embodiment of a device.

Features of any embodiment or implementation presented herein may be combined with other features and other embodiments or implementations presented herein wherever it seems technologically desirable.

The previous description of the disclosed embodiments is provided to enable any person skilled in the art to make or use the present invention. Various modifications to these embodiments will be readily apparent to those skilled in the art, and the generic principles defined herein may be applied to other embodiments, arrangements or systems without departing from the scope of the invention. Thus, the present invention is not intended to be limited to the embodiments shown herein but is to be accorded the widest scope consistent with the principles disclosed herein.

The invention claimed is:

1. A network entity for managing communications towards a user entity over a communication network, the network entity having:
   an access domain selector, collocated to the network entity, for determining an access domain of the user entity upon a basis of user entity specific data;
   wherein an access domain selector implemented on a hardware processor;
   a storage collocated to the network entity; and
   an IP Multimedia Subsystem application server, collocated to the network entity and separate from the access domain selector, for providing the user entity specific data, configured to
   transmit a request, via an Sh interface according to the IP Multimedia Subsystem, for the user entity specific data towards a home subscriber server;
   receive the user entity specific data from the home subscriber server upon transmitting the request; and
   store the user entity specific data in the storage,
   wherein the access domain selector is further configured to
   retrieve the user entity specific data upon receiving a session initiation protocol request, the session initiation request requesting to establish a communication link towards the access domain serving the user entity for an incoming session;
   refer to the storage of the application server to obtain the user entity specific data; and
   when the user entity specific data is unavailable from the storage, query the user entity specific data from the home subscriber server;
   wherein the application server is an IP Multimedia Subsystem multimedia telephony service application server;
   wherein the access domain selector is an IP Multimedia Subsystem access domain selector configured as a service centralization and continuity application server; and
   wherein the user entity specific data comprises:
   repository data according to the IP Multimedia Subsystem technology,
   a network identifier, wherein the network identifier is a visitor location register number,
   voice support information indicating whether the access domain supports a voice service within a packet-switched access domain,
   information relating to a communication status of the user entity, the communication status indicating whether the user entity is in a busy status, an idle status, a non-available status, or a non-network registered status,
   type information indicating a type of the access domain, the type of the access domain indicating a packet-switched access domain or a circuit-switched access domain, and a user entity identifier, wherein the user entity identifier is an International Mobile Subscriber Identity.

2. The network entity of claim 1, wherein the access domain selector is configured to retrieve the user entity specific data from the storage.

3. The network entity of claim 1, wherein the application server is configured to determine the user entity specific data upon registration of the user entity to the communication network.

4. The network entity of claim 1, wherein the application server is an IP Multimedia Subsystem application server being configured to receive the user entity specific data via an Sh interface over the communication network.

5. The network entity of claim 1, wherein the network entity or the application server and the access domain selector has a transmitter for transmitting a request for the user entity specific data towards the communication network.

6. The network entity of claim 1, wherein the network entity or the application server or the access domain selector has a receiver for receiving the user entity specific data from the communication network.

7. The network entity of claim 1, wherein the access domain selector is configured to determine upon the basis of the user entity specific data
whether the access domain is a packet-switched access network; or
whether the access domain is a circuit-switched access network.

8. A method for managing communications towards a user entity over a communication network, the method being performed by a network entity having an IP Multimedia Subsystem access domain selector configured as a service centralization and continuity application server, collocated to the network entity, a storage collocated to the network entity, and an IP Multimedia Subsystem multimedia telephony service application server collocated to the network entity and separate from the access domain selector, the method comprising:

providing user entity specific data by the application server for access domain selection, including transmitting a request, via an Sh interface according to the IP Multimedia Subsystem, for the user entity specific data by the application server towards a home subscriber server, receiving the user entity specific data by the application server from the home subscriber server upon transmitting the request, and storing the user entity specific data by the application server in the storage; and determining an access domain of the user entity by the access domain selector upon a basis of the user entity specific data, including retrieving the user entity specific data upon receiving a session initiation protocol request, the session initiation request requesting to establish a communication link towards the access domain serving the user entity for an incoming session, referring to the application server to obtain the user entity specific data, and when the user entity specific data is unavailable from the storage, querying the user entity specific data from the home subscriber server, wherein the user entity specific data comprises:

repository data according to the IP Multimedia Subsystem technology, a network identifier, wherein the network identifier is a visitor location register number, voice support information indicating whether the access domain supports a voice service within a packet-switched access domain, information relating to a communication status of the user entity, the communication status indicating whether the user entity is in a busy status, an idle status, a non-available status, or a non-network registered status, type information indicating a type of the access domain, the type of the access domain indicating a packet-switched access domain or a circuit-switched access domain, and a user entity identifier, wherein the user entity identifier is an International Mobile Subscriber Identity.

* * * * *